United States Patent [19]

Rhodes

[11] Patent Number: 4,684,156
[45] Date of Patent: Aug. 4, 1987

[54] PRELOADED SPACE STRUCTURAL COUPLING JOINT

[75] Inventor: Marvin D. Rhodes, Yorktown, Va.

[73] Assignee: The United States of America as represented by the Administrator of the National Aeronautics and Space Administration, Washington, D.C.

[21] Appl. No.: 890,445

[22] Filed: Jul. 30, 1986

[51] Int. Cl.⁴ .............................................. F16L 21/06
[52] U.S. Cl. ........................................ 285/27; 285/31; 285/86; 285/373; 285/421; 403/341
[58] Field of Search ................ 285/419, 373, 31, 421, 285/27, 86; 403/100, 341

[56] References Cited

U.S. PATENT DOCUMENTS

| | | | |
|---|---|---|---|
| 2,173,399 | 9/1939 | Mills . | |
| 2,517,391 | 8/1950 | Ernestus . | |
| 2,895,757 | 7/1959 | Kaspar | 403/100 |
| 2,903,279 | 9/1959 | Bergstedt et al. | 285/373 |
| 2,999,700 | 9/1961 | Smith | 285/373 X |
| 3,287,031 | 11/1966 | Simmons et al. | 285/27 |
| 3,413,030 | 11/1968 | Drake | 285/419 X |
| 3,495,853 | 2/1970 | Furrer . | |
| 3,516,688 | 6/1970 | Gachot | 285/31 |
| 3,606,407 | 9/1971 | Pendergast | 403/341 X |
| 3,689,114 | 9/1972 | Meserole | 285/419 |
| 3,711,126 | 1/1973 | Hara et al. | 285/39 X |
| 3,873,139 | 3/1975 | McCabe | 285/419 X |
| 4,035,002 | 7/1977 | Curtin | 285/419 X |
| 4,159,132 | 6/1979 | Hitz | 285/421 X |
| 4,168,090 | 9/1979 | Kaufmann, Jr. | 285/419 X |

*Primary Examiner*—Thomas F. Callaghan
*Attorney, Agent, or Firm*—George F. Helfrich; John R. Manning

[57] ABSTRACT

This invention relates to a coupling device for tubular members (11 and 12), of large truss structures, with a locking collar 20 being the only moving part. Each tubular member is constructed with an end bell section 15 that has a belled flange 17 with a mating face 18, and a necked area 16 which is smaller in diameter than the tubular members to be joined. A split ring 30 is affixed to each tubular member and is constructed so that then two tubular members are laterally moved into axial alignment and collar 20 is rotated thereover, the split ring loads the joint with axial force by pressing the belled flange mating surfaces together, and a preloading force is provided by the collar 20 mating with a taper on the outside of the split rings. All free play is thereby removed by preloaded force. A major object of the invention is to provide an ability to remove and replace individual tubular members without disturbing other structural parts of a truss structure. An additional anticipated use of this joint is to couple high pressure fluid lines.

8 Claims, 5 Drawing Figures

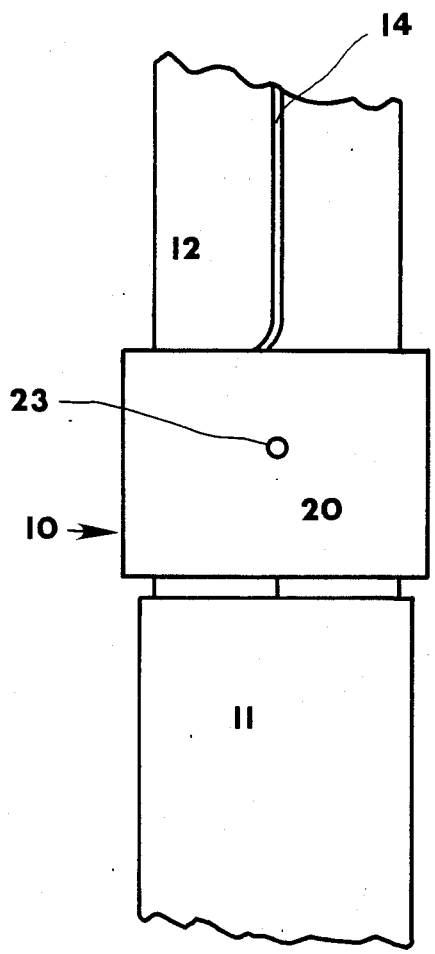
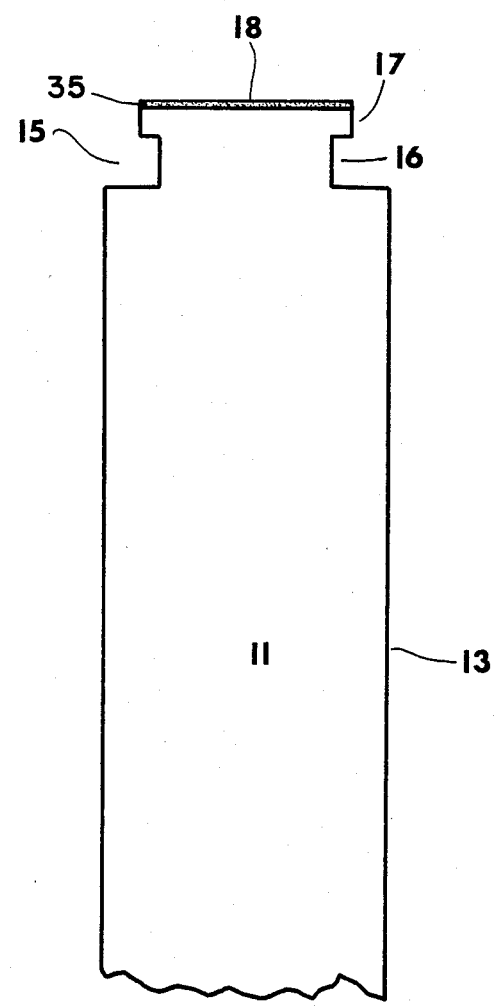
FIG. 1                     FIG. 2

PRELOADED SPACE STRUCTURAL COUPLING JOINT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to the field of space structures. More particularly, the invention is oriented toward a structural joint concept for rapid assembly of truss stringers of large space structures. The potential use is in the construction of our nation's space station, contemplated and under development by the National Aeronautics and Space Administration.

There is a need for quick-erect truss structures that can be used in a variety of earth applications, as well as in space construction. These might be associated with towers that facilitate microwave and/or electrical power transmission and geodesic dome type architecture. In space, applications encompass the keel beam of the proposed space station, antennae masts, large platforms and solar energy truss support systems. These structures, both space and terrestrial, typically have a large number of joints, and a quick connect feature is mandatory to facilitate assembly in space at a single visit.

Other requirements of truss structural joints for use in space construction include a requirement that the joints be simple, inexpensive to fabricate, easy to inspect and easy to assemble by a space suited astronaut. A positive latching that will not loosen due to vibration or handling is required, and a direct structural load path through the joint so as to maximize both strength and stiffness is also requisite. The coupled joint should also have no external protrusion, and the unassembled member parts should be free of sharp or pointed edges, which could endanger the astronaut or puncture his pressure suit. The coupling joints planned to facilitate construction of a space station or other structurally redundant space frame require side entry attachment so as to provide removal of a single truss strut for repair and/or inspection without disassembly of additional pieces of the structure. It is also desirable to preload the joint axially to remove free-play and provide a linear load displacement response over a prescribed load range. Finally the optimum joint will be capable of any size application over a large range of large and small structural members.

A number of joints exist to couple struts in a truss structure, but none meet the plurality of requirements listed hereinabove.

Accordingly, it is an object of the present invention to provide a means of coupling tubular members such as struts or stringers that is easy to fabricate and which can be easily and quickly connected or disconnected.

Another object of the present invention is to provide a coupling means to join tubular members such as struts or stringers in a truss structure that is easy to construct and that has a minimum of moving parts.

A further object of the present invention is a means to join tubular members such as struts or stringers having positive latching that precludes loosening due to vibration or handling.

Yet another object of the present invention is to provide a coupling joint having a direct structural path co-linear with the centerline of the tubular members for maximum load bearing strength and stiffness.

Another object of the present invention is to provide a coupling means for tubular members such as struts or stringers that is free of sharp edges or protrusions, both coupled and unassembled, to protect space workers and facilitate packaging in a vehicle cargo bay.

Another object of the instant invention is a coupling joint for tubular members such as struts or stringers that permits side attachment and removal in a manner that allows removal of any single strut without disassembly of other pieces of the space truss structure.

Yet another object of the present invention is a coupling joint that when assembled does not have any axial free-play.

A further object of the present invention is to provide a coupling means for tubular members such as struts or stringers that can be preloaded with axial force to provide linear load-displacement response over a prescribed load range.

Yet another object of the present invention is to provide a joint capable of being fabricated for use with tubular members such as structural struts or stringers over a large range of sizes and load bearing capabilities.

STATEMENT OF THE INVENTION

According to the present invention, the foregoing and additional objects are attained by constructing tubular members, e.g., stringers which may be assembled to a node to form a truss structure. The construction is such that side entry connects the nodes and stringers. Each node and stringer is constructed with a split locking ring having tapered internal sides that are forced onto a matched taper on an end bell. This preloads the coupling with axial force. The split locking ring is loosely attached to each end bell with screws or pins. When the stringer and node are slid together to make the joint, a wedged fit develops between the split locking ring and the end bells. A slidable collar attached to the stringer has an internal taper to match an external taper machined on each split ring. The collar is then forced over the mated halves of the split ring, thereby forcing the end bells together. The combination of the matching taper on the end bell and internal split locking ring, and the matching taper on the interior of the slidable collar and exterior of the split locking ring axially preload the coupling joint internally. The pitch of the tapers may be varied to obtain different preloads. The collar is held in place by two pins or screws that are connected thereto and ride in corresponding grooves machined into the stringer having the collar affixed. Each groove runs axially up opposite sides of the stringer and then transitions to a spiral, circumscribing approximately 180° of the circumference of the stringers. The last few degrees of each grooved spiral turn perpendicular to the axis of each stringer; that is, the pitch of the spiral goes to zero, providing a locking position for the collar. The correspondence of the collar pins riding in the grooves on the stringer allows for rapid advancement of the collar to the locked position around the joint. Locking forces are developed when the collar and split ring are in contact. The collar may be rotated by hand or by a spanner wrench if large clamping loads are required. Under such conditions, a hole to engage the spanner pin would be machined into the collar, and then a large clamping force could be applied to the joint with a spanner wrench.

The split ring may be made in one piece and split radially after final machining or it may be made from separately machined rings. The slopes of the mating tapers on the split ring and the end bells are small. The prototype model tested by the National Aeronautics and Space Administration utilized a seven degree taper, and testing confirmed this as adequate to remove all free-play and provide linear load displacement response through the coupled joint. This seven degree taper nevertheless allows the parts to be easily separated when the collar is released.

An alternate function of this unique coupling would be to join sections of high pressure fluid or vapor conduits for use in hydraulic or pneumatic systems. In fluid applications an appropriate material known to those skilled in the art would be incorporated to seal the end bells. In both applications, release and removal is accomplished by reversing the rotation of the collar and allowing it to slide down the stringer away from the joint to the unlocked position.

BRIEF DESCRIPTION OF THE DRAWINGS

A more complete appreciation of the invention and many of the attendant advantages thereof will become more readily apparent as the same becomes better understood by reference to the following detailed description when considered in connection with the accompanying drawings wherein:

FIG. 1 llustrates an overview of the coupled joint of the present invention;

FIG. 2 illustrates an end bell of FIG. 1 without an attaching split ring collar;

DETAILED DESCRIPTION OF THE INVENTION

Figure 3:
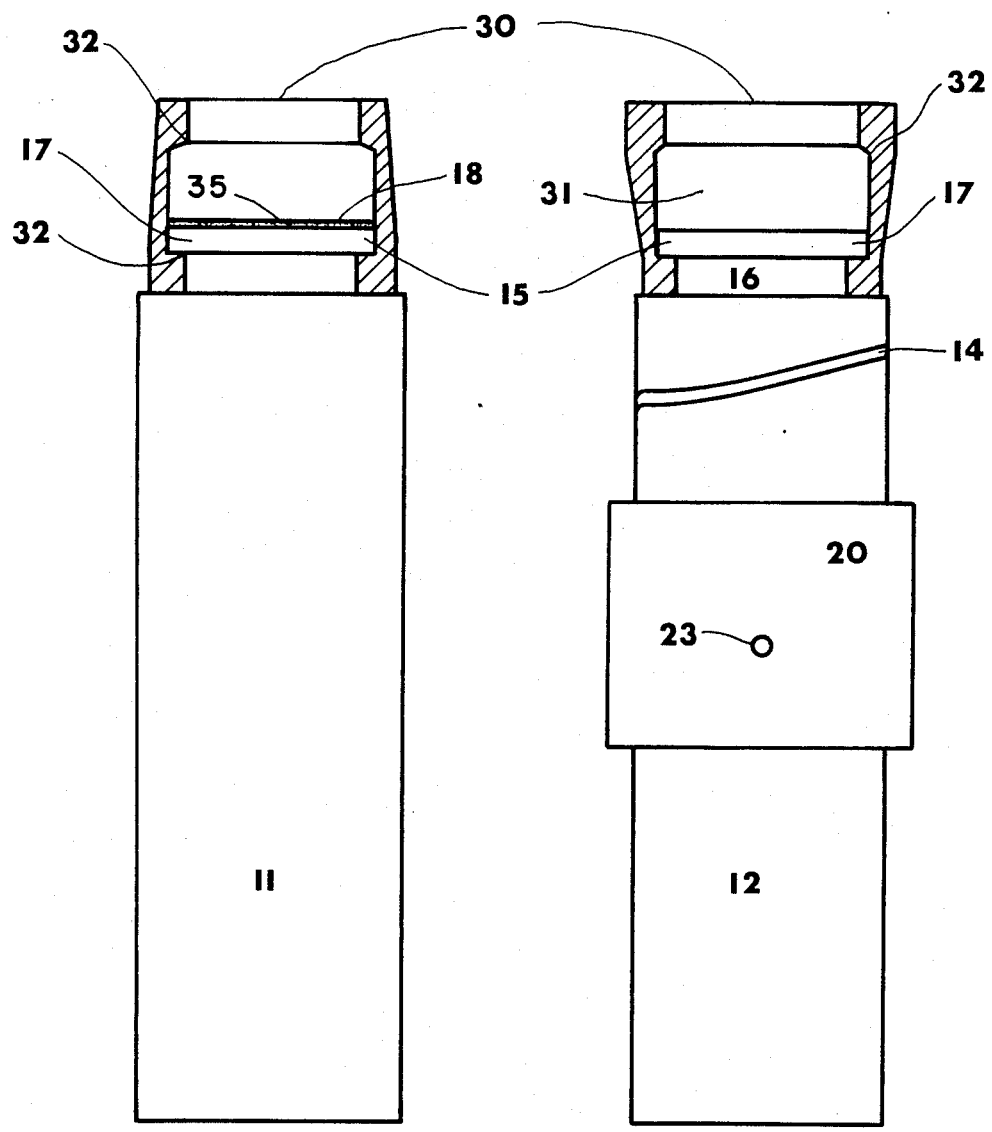
FIG. 3 is a separated view showing the relationship of split ring and end bells.

In describing the preferred embodiment of the present invention illustrated in the drawings, specific terminology has been and will be resorted to for the sake of clarity. However, it is not intended for the invention to be limited to specific terms so selected, and it is to be understood that each specific term includes all technical equivalents which operate in a similar manner to accomplish a similar purpose. For example, the term stringer when used herein should include all tubular members, struts, pipes and conduits.

Turning now to the specific embodiment of the invention selected for illustration in the drawings, and referring more particularly to FIG. 1, the numeral 10 designates generally the coupled joint of the present invention. As shown therein, all physical parts of the coupling make a smooth package with no sharp protrusions, and the joined parts have a direct structural load path co-linear with the stringer centerline for maximum load bearing strength and stiffness.

The coupling joint is simple and economical to construct and has few parts. The only moving part is collar 20 shown in the coupled position in FIG. 1.

The rapid action coupling joint of the present invention requires that node end 11 and stringer (tubular member) 12 be constructed with end bells. Turning to FIG. 2, the numeral 11 designates a node end with a constructed end bell 15. The bell has an inner neck 16 and a bell flange 17 with a mating surface 18. The node end 11 and stringer 12 may be any diameter and thickness. A prototype model tested by the National Aeronautics and Space Administration used two inch aluminum pipe with one-eighth inch thick walls for the body of the node end 11. The outside diameter of the bell neck 16 of node end 11 was one and one-fourth inches and the inside diameter of the bell neck was one inch. The flared portion of the bell 17 began with the same one inch inside diameter and expanded to a one and one-half inch outside diameter, providing an annular, flat mating surface 18 which was one-quarter inch wide. The two adjoining members 11 and 12 in FIG. 1 may be identically constructed or member 11 may be constructed with a slightly smaller diameter than the member 12. The tested prototype model used aluminum pipe and an outside diameter of slightly less than one and three-quarter inches and an inside diameter of slightly less than one and a half inches. This allowed special packaging whereby the first member 11 could be packaged inside the second member 12 leaving only the final approximately three inches of the second member 12 containing collar 20 protruding outside of member 11 and extending from the packaged length of the two members by the same three inches. This prototype sizing allows dense packaging for transport in the cargo bay of the Space Shuttle. It is worthy of note that both the first member 11 and second member 12 can be constructed with a bell neck 16 and bell mating surface 18, identical in size, even if the stringers employed different body 13 sizes for packaging.

Turning to FIG. 3 the two halves of split locking ring 30 may be observed. The split locking ring may be constructed in one piece and then radially bifurcated. Each half of locking ring 30 is then attached, one to each bell section 15. The inside diameter of the locking ring 30 is slightly greater than the outside diameter of bell neck 16, with a recessed area 31 having an inside diameter slightly greater than the diameter of the mated bell flanges 17. The radial walls 32 of recess 31 have a wedge form in relation to the mated bell flanges 17. The pitch of the recess walls 32 may be varied to apply different mating forces to the bell flanges 17 when stringers are coupled and the joint locked. As the two members 11 and 12 are placed in axial alignment with the two halves of locking ring 30 coming together to form a cylindrical sleeve, the pitch of recess walls 32 forces a wedged fit around the mated bell flanges 17, forcing bell mating surfaces 18 together.

Figure 4:
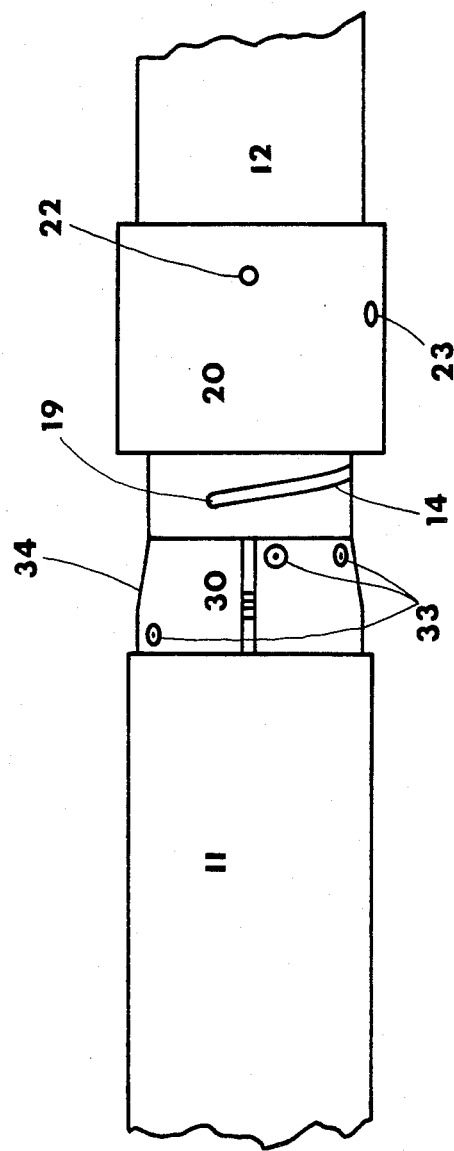
FIG. 4 is a line view showing axial alignment of tubular members and split locking ring.

FIG. 4 shows the axial alignment of members 11 and 12, and also shows the method of attaching each half of the locking ring to the bell sections of each member. Either pins or screws 33 attach to the bell neck of each member to retain each half of split locking ring 30 to its respective member. FIG. 4 also shows that the outside diameter of locking ring 30 is tapered. This taper is machined with the outside diameter of mated locking ring 30 gradually decreasing longitudinally to a point near the end of the split locking ring attached to member 12. Collar 20 has a matching inverse taper 21 (FIG. 5) machined on its inside surface so that when collar 20 is in position around the split locking ring, a wedged fit develops, forcing the locking ring together and internally loading the coupling. The prototype model discussed previously had a twelve degree matching taper machined on the outside of the locking ring 30 and the collar 20.

Collar 20 is a circumferential sleeve with an inside diameter at its smallest point slightly larger than the outside diameter of member 12, to provide a close slidable relationship. Two grooves 14 (FIG. 4) are machined into member 12, and run longitudinally before transitioning into a spiral around the circumference of the body. The pitch of each spiral goes to zero and functions as a locking position. The grooves 14 are on opposite sides of the circumference of body 13 of member 12 and remain in that relationship throughout their spirals. Two holes are machined through collar 20 in proximity to the end of the collar away from the connection, and 180° apart. Two screws or pins 22 are threaded or pressed through these holes and their protruding sections ride in grooves 14, guiding collar 20 up and around the spirals. The inside taper 21 of collar 20 gradually wedges against the inverse taper 34 on the outside of split locking ring 30.

Figure 5:
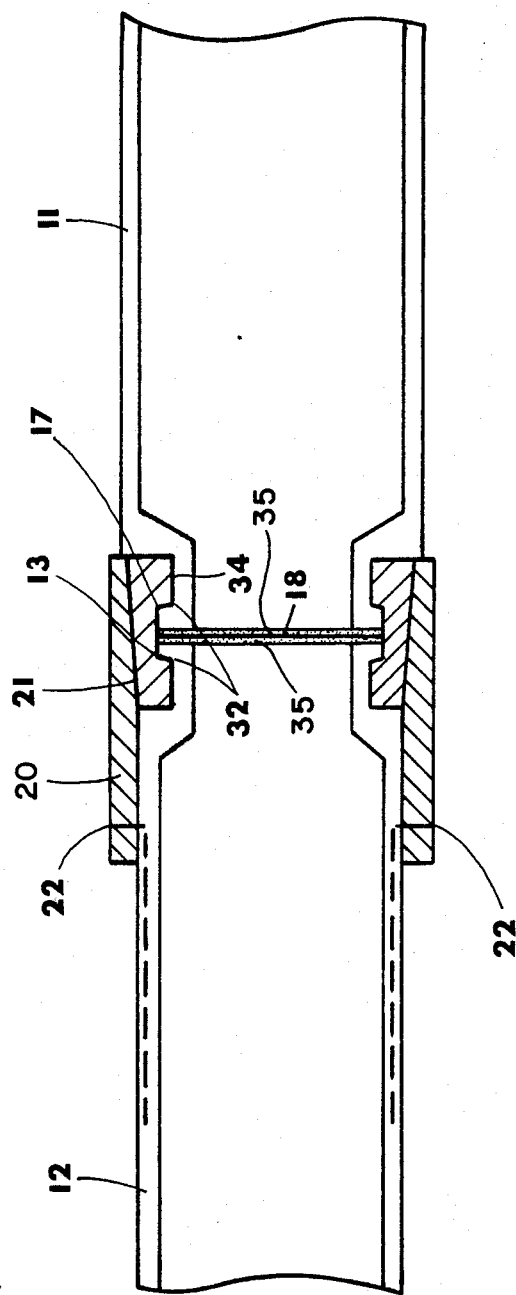
FIG. 5 is a longitudinal cross-section of the coupling of FIG. 1.

Turning to FIG. 5, the operative forces which preload this coupling may be more readily understood. With collar 20 up, rotated and locked in place around the joint, it is seen how the collar inside diameter taper 21 applies force to the matching taper 34 machined on the outside diameter of locking ring 30, forcing the two halves of locking ring 30 together. This in turn forces the inner recessed walls 32 to wedge the bell flanges 17 together, thus the mating surfaces 18 of bell section 15 are in forced contact. Note that a gasket material 35 known to those skilled in the art could be applied to bell mating surfaces 18 forming a fluid seal and allowing this joint to be used to couple sections of high pressure fluid conduits or pipe.

With collar 20 in the unlocked position, members 11 and 12 can be separated completely with side motion, thus allowing a stringer to be removed or replaced in a structurally redundant truss assembly without disassembly of other sections or stringers. This feature has utility in high pressure fluid applications as well, as one section of pipe can be removed without disturbing sections on either end.

Tapers 21, 34 and 32 can be varied to adjust the preloading force, which would be necessary to ensure fluid integrity in high pressure fluid applications.

Collar 20 may have a cross-hatched outside surface for the convenience of extravehicular astronauts who, in pressure suits, will be connecting the stringers by hand. Hole 23 (or holes), may be machined in the collar to facilitate the use of a spanner wrench, if high preload forces are required.

Numerous other variations and modifications of the invention will be readily apparent to those skilled in the art in the light of the above teachings. Thus, within the scope of the appended claims, the invention may be practiced other than as specifically described hereinabove.

What is claimed as new and desired to be secured by Letters Patent of the United States is:

1. A coupling joint for tubular members of truss structures comprising:
   a first tubular member having a first end and a second end, the first end having a bell flange with a flat, annular mating surface and having an inverse radial taper on its inside surface displaced from normal to the axial alignment of said first tubular member, wherein said first tubular member has two longitudinal grooves machined into the outside surface thereof which run axially to a location spaced from an annular split ring attached to the first end of said first tubular member, and then begin a spiral 180° around the outside surface of said first tubular member;
   a second tubular member to be joined to said first tubular member, the second tubular member having a first end and a second end, the first end having a bell flange with a flat, annular mating surface and having an inverse radial taper on its inside surface corresponding to said inverse radial taper of said first tubular member displaced from normal to the axial alignment of said second tubular member;
   means to apply mating pressure to the first ends of said first and second tubular members, which comprises the annular split ring having an inner recess on the inside circumferential surface with a tapered radial wall displaced from normal to the axial alignment of said first and second tubular members, the annular split ring bifurcated radially into identical halves, each attached with attachment means to one of the first ends of said first and second tubular members;
   means to lock said first and second tubular members in operative coupled relationship, consisting of an annular sleeve with two guide pins attached normal to the axial alignment of said first and second tubular members, and protruding inwardly from the inside surface of the sleeve, with the sleeve in slidable relationship to the outside diameter of said first tubular member, so that the sleeve is first guided axially by the pins in correspondence with the grooves to a position around the coupled first and second ends of said first and second tubular members, and is then guided in rotation as the guide pins traverse along the spiral of the grooves;
   whereby said first and second tubular members are affixed in axial alignment with no free play.

2. A coupling joint according to claim 1 wherein the spiral of the grooves on said first tubular member continues further around the outside circumference of said first tubular member with a pitch of zero, resulting in the last portion of the grooves being parallel to a line normal to the axis of said first tubular member, whereby
   the pins guiding the sleeve as it is moved axially over the coupled first and second ends of said first and second tubular members and rotated, move into the last portion of each corresponding groove and lock the collar in place.

3. A coupling joint according to claim 2 wherein said sleeve has an inside surface with a longitudinal taper to the radius of the sleeve, resulting in the inside radius of the sleeve being larger at the end corresponding to the coupling joint than at the end of the sleeve away from the joint, and
   the outside diameter of said split ring has an outside surface with a longitudinal taper to the outside radius, inverse to the taper on said sleeve, with the outside diameter of the split ring larger at the end making the coupling than at the end away from the coupling;
   whereby rotating said sleeve up and around the joint brings the sleeve taper in wedged relationship with the split ring taper, thereby applying a preload to the joint, removing free play and resulting in a linear load bearing capability.

4. A coupling joint according to claim 2 wherein said sleeve has attachment holes running through the wall of the sleeve normal to the longitudinal axis, and the guide pins are screws threadably attached within the holes.

5. A coupling joint according to claim 2 wherein said sleeve has attachment holes running through the wall of the sleeve normal to the longitudinal axis, and the guide pins are attached by pressing into the holes.

6. A coupling joint according to claim 3 wherein said first and second tubular members have sealing material on the mating surfaces of their bell flanges, so that said first and second tubular members function as high pressure fluid conduits capable of being removed and replaced with side movement, without disturbing other sections of conduit in a pressure system.

7. A coupling joint according to claim 3 wherein said first tubular member is smaller in diameter than said second tubular member, allowing said first tubular member to be stored inside said second tubular member with only a small portion of said first tubular member, corresponding to the section containing the sleeve, external to the second tubular member, whereby packing of a plurality of first and second tubular members can be efficiently obtained, allowing transport in the cargo bay of a vehicle to carry on-orbit as construction materials for a space station.

8. A coupling joint according to claim 3 wherein said sleeve has a machined hole centered axially through the wall of the sleeve, whereby a spanner wrench can be used to rotate the sleeve forcing the joint together with high preloads.

* * * * *